US005286002A

United States Patent [19]

Bergstrom

[11] Patent Number: 5,286,002

[45] Date of Patent: Feb. 15, 1994

[54] FUEL INJECTOR HAVING A COMPOSITE SILICON VALVE

[75] Inventor: John Bergstrom, Williamsburg, Va.

[73] Assignee: Siemens Automotive L.P., Auburn Hills, Mich.

[21] Appl. No.: 3,205

[22] Filed: Jan. 12, 1993

[51] Int. Cl.[5] .............................................. F16K 31/02

[52] U.S. Cl. ................................ 251/368; 251/129.06

[58] Field of Search ................... 251/331, 368, 129.06; 239/102.1, 494

[56] References Cited

U.S. PATENT DOCUMENTS

| | | | |
|---|---|---|---|
| 4,628,576 | 12/1986 | Giachino et al. | 29/157.1 R |
| 4,647,013 | 3/1987 | Giachino et al. | 251/331 |
| 4,756,508 | 7/1988 | Giachino et al. | 251/331 |
| 4,808,260 | 2/1989 | Sickafus et al. | 156/644 |
| 4,826,131 | 5/1989 | Mikkor | 251/368 |
| 4,907,748 | 3/1990 | Gardner et al. | 251/129.06 |

*Primary Examiner*—A. Michael Chambers
*Attorney, Agent, or Firm*—George L. Boller; Russel C. Wells

[57] ABSTRACT

Nozzle structures for fuel injectors are fabricated from silicon wafers assembled together to accurately control valve lift so that a separate step of setting valve lift is unnecessary. Sealing surfaces are P+ silicon.

10 Claims, 1 Drawing Sheet

FUEL INJECTOR HAVING A COMPOSITE SILICON VALVE

FIELD OF THE INVENTION

The present invention relates generally to electromechanically actuated fuel injectors for internal combustion engines and, specifically, to a new and improved composite silicon valve for such a fuel injector.

BACKGROUND AND SUMMARY OF THE INVENTION

It is known to fabricate the valves of electromechanical actuated fuel injectors from materials, such as stainless steels, by metalworking processes, such as milling and grinding. While such processes can produce high degrees of accuracy in finished parts, they possess certain inherent limitations. Specifications for tolerable leakage are becoming increasingly strict, pushing such processes to their limits.

Fuel injectors having valves made from silicon elements, have been suggested to provide even closer tolerances in finished parts; for example, see U.S. Pat. Nos. 4,628,576; 4,647,013; 4,756,508; 4,826,131; 4,808,260 and 4,907,748.

The present invention relates to improvements in such silicon valves.

One aspect of the invention relates to an organization and arrangement of a composite silicon valve that provides for precise control of valve lift while also disposing the gate directly in the flow path through the valve so that when the injector is flowing, the gate remains in the flow path, rather than to one side of the flow path, and this is especially important for a single stream fuel injector that injects fuel coaxial with the fuel injector's main longitudinal axis.

Another aspect of the invention relates to improved compliancy of the gate to the seat when the valve is closed. This is achieved by making one or both of the silicon sealing surfaces of the gate and/or seat of P+ silicon preferably as a surface layer having a preferred thickness in the range of about 10 microns to about 30 microns.

Still another aspect of the invention relates to the inclusion of a thin disc orifice member formed from silicon which comprises one or more metering orifices for metering the flow from the valve.

BRIEF DESCRIPTION OF THE DRAWINGS

The various features, objects, benefits, and advantages of the present invention will become more apparent upon reading the following detailed description of a preferred embodiment according to the best mode contemplated at this time for carrying out the invention, and the appended claims, in conjunction with the drawings, wherein like reference numerals identify corresponding components, and:

DESCRIPTION OF THE PREFERRED EMBODIMENT

Figure 1:
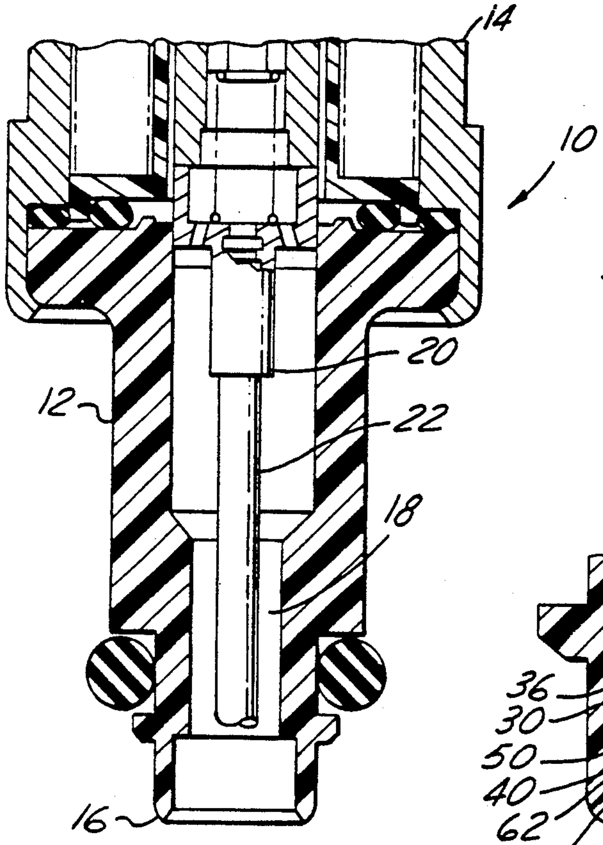
FIG. 1 is a fragmentary, cross-sectional view of a fuel injector.
Figure 3:
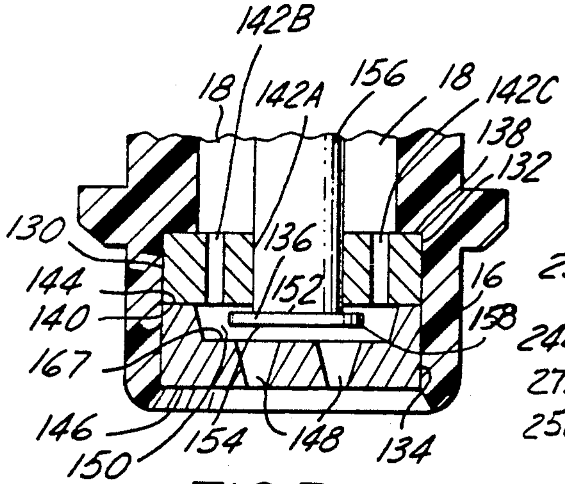
FIG. 3 is a fragmentary, cross-sectional view of a second valve embodiment.
Figure 4:
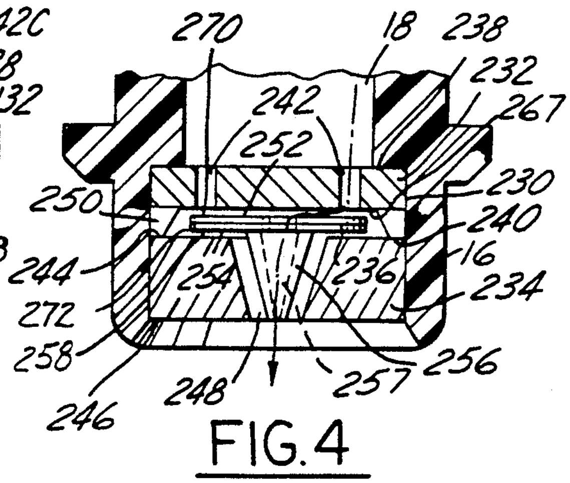
FIG. 4 is a fragmentary, cross-section view of a third valve embodiment.

A portion of a fuel injector 10 is illustrated in FIG. 1. Any of the embodiments illustrated in FIGS. 2, 3 and 4 are used with fuel injector 10.

Fuel injector 10 includes body structure 12 for the various components. It has a top end 14 and a bottom end 16. Top end 14 has an inlet connected to a fuel source (not shown) for fuel to flow along a fuel flow passage 18 to bottom end 16. Positioned within body structure 12 is an actuator assembly 20, including an electromagnetic coil and bias spring, imparting longitudinal reciprocal movement to an armature 22 which includes a needle extending along the central longitudinal axis of body 12 structure.

Figure 2:
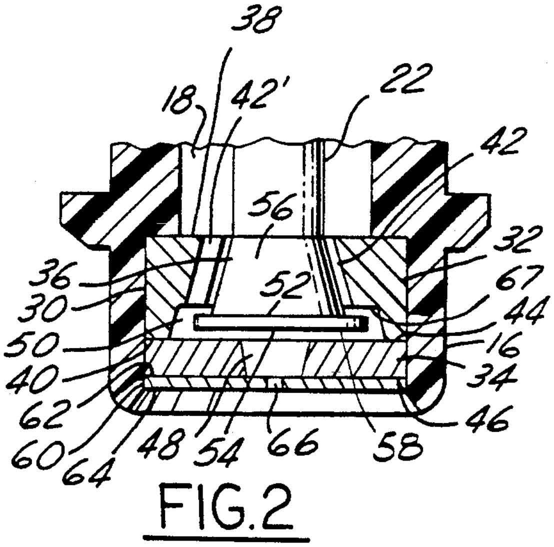
FIG. 2 is a fragmentary, cross-sectional view of a first embodiment of a composite silicon valve forming a nozzle in the bottom end of the fuel injector.

FIG. 2 shows a first embodiment of composite silicon valve 30 mounted in bottom end 16 to form a nozzle from which fuel is injected as the fuel injector operates. Valve 30 comprises a first silicon wafer 32, a second silicon wafer 34 and a silicon gate 36, each of which is fabricated by known micromachining technology from silicon having a crystalline arrangement commonly designated {110}.

Wafer 32 has an upper surface 38, a lower surface 40 and a through-passage means 42 extending from surface 38 to surface 40. Similarly, wafer 34 has an upper surface 44, a lower surface 46, and a through-passage means 48 extending from surface 44 to surface 46. The two through-passage means form a through-passage which extends through the valve body thus formed by wafers 32, 34; through-passage means 42 being the inlet, and through-passage means 48, the outlet. In addition the through-passage comprises a radially enlarged zone 50 cooperatively defined between wafers 32, 34. Zone 50 may be formed in whole in either wafer or in part in both wafers.

Gate 36 is disposed within zone 50 and has an upper surface 52 and a lower surface 54. A connecting portion 56 extends from the gate through through-passage means 42 and joins with the distal end of the armature needle. Gate 36 is reciprocated within zone 50 upon longitudinal reciprocal movement of armature 22 along the central axis of the fuel injector. Gate 36 also includes a surface 58 that selectively seats on and unseat from surface 44.

A third silicon wafer 60 of uniform thickness is situated adjacent wafer 34 and has an upper surface 62 disposed against surface 46. It also has a lower surface 64 opposite surface 62. A circular metering orifice 66 extends centrally through wafer 60 between surfaces 62 and 64. This wafer 60 performs a thin disc metering orifice function to meter the flow from the injector.

By providing zone 50, a surface 67 is created in wafer 32 in juxtaposition to surface 44. The axial dimension between surfaces 67 and 44, less the axial dimension (thickness) of gate 36, serves to set the valve lift. This is because surface 52 will abut surface 67 to limit the upstroke and surface 54 will abut surface 44 to limit the downstroke. Because of precision capabilities of silicon micromachining used to fabricate the wafers and the gate, the lift may be very accurately controlled. Accordingly, a fuel injector embodying the invention may not require a lift adjustment step during its fabrication and calibration process.

FIG. 2 shows gate 36 in an intermediate position of travel. When it is positioned to abut surface 44, the injector is closed; when it is positioned to abut surface 67, the injector is open. Through-passage means 42 includes a slot 42' that allows fuel to flow around gate 36 to orifice 66 when surface 52 is abutting surface 44. It is to be observed that when the injector is open, gate 36 remains in the fuel flow path to allow flow around the outer edge of the gate toward the centrally located through-passage means 48 and metering orifice 66.

Improved sealing of the gate to the valve seat when the valve is closed is attained by constructing gate 36 such that surface 54 is a surface layer of P+ silicon having a preferred thickness in the range of about 10 microns to about 30 microns. The P+ silicon layer provides improved compliancy.

FIG. 3 shows a second composite valve 130 having silicon wafers 132, 134 forming a valve body, and a silicon gate 136. Wafer 132 and gate 136 are fabricated from {100} silicon, and wafer 134, from {100} silicon. Wafer 132 has upper and lower surfaces, 138, 140, and wafer 134 upper and lower surfaces 144, 146. The two wafers are bonded together at surfaces 140, 144. Gate 136 has upper and lower surfaces 152, 154, corresponding to surfaces 52, 54 of the first embodiment.

Through-passage means of wafer 132 comprises three separate, straight through-passages 142A, 142B, 142C. A zone 150 is cooperatively defined between wafers 132, 134 and provides in wafer 134 a surface 167 analogous to surface 44 in FIG. 2 in that it provides an abutment that limits the downstroke of gate 136. Surface 140 is the surface that is juxtaposed to surface 167 in zone 150 to provide an abutment to limit the upstroke of gate 136. Wafer 134 has through-passage means 148 in the form of two tapered holes which are spaced 180 degrees apart on an imaginary circle that is concentric with the central longitudinal axis of the fuel injector.

Passages 142B, 142C are continuously open for all positions of gate 136. FIG. 3 illustrates the gate in an intermediate position. When surface 152 abuts surface 140, the valve is fully open and fuel flows through passages 142B, 142C, around the outer edge of gate 136 as it passes through zone 150, and finally through passages 148. The armature needle is designated 156 and passes completely through passage 142A to join with gate 136. Joining is done in any conventional manner such as by electrostatic welding or resistance welding. Surface 154 has a layer of P+ silicon exactly like the previous embodiment so that when gate 136 abuts surface 167 to close the injector, the gate compliantly seals against the valve seat.

FIG. 4 shows a third valve embodiment 230 having wafers 232, 234 arranged in an analogous manner to FIG. 2 insofar as the creation of its zone 250, corresponding to zone 50 in FIG. 2, is concerned. Thus, surfaces 240, 244, 246, 238, 267 in FIG. 2 correspond to surfaces 40, 44, 46, 38, 67 in FIG. 1. However, through-passage means 242, through-passage means 248, and gate 236 are different from their counterparts in FIG. 2. Gate 236 comprises an upper portion in the form of a magnetically permeable metal layer 270 and a lower portion in the form of a silicon layer 272. A tapered cone 256 extends downwardly from the lower gate portion, passing through the single tapered through-passage means 248 concentric with the injector's axis. Wafer 234 is {110} silicon while wafer 232 and the silicon portion of gate 236 are {100} silicon. The construction that consists of elements 252, 270, 256, 236, 242, 254, 258 can be a free assembly that floats in the silicon frame 256 or it could be attached to the frame by a thin silicon beam(s) which could be stressed to improve closing response.

FIG. 4 shows the gate in an intermediate position. When the gate is operated to abut gate surface 252 with surface 267, it closes through-passage means 242, thereby closing the injector. When it is positioned to abut surface 254 with surface 244, the injector is fully open and in such case the fuel flow follows the representative path designated by the arrow. To provide for this flow, gate 236 is constructed with its own passageway structure providing for the fuel to enter, flow radially inwardly and then downwardly to an outlet in the tip end of cone 236.

While a preferred embodiment of the present invention has been described, it should be appreciate that principles are applicable to other embodiments falling within the scope of the following claims.

What is claimed is:

1. A silicon valve comprising a silicon valve body member having through-passage means and comprising a seat having a seat surface, and a gate that comprises a silicon element and that is selectively positionable to seat and unseat a surface of said silicon element on and from said seat surface, in which one of said surfaces comprises a p+ surface layer.

2. A silicon valve as set forth in claim 1 in which said one surface is said surface of said silicon element.

3. A silicon valve as set forth in claim 2 in which said p+ surface layer has a thickness within the range of about 10 microns to about 30 microns.

4. A composite silicon valve comprising a first silicon element having first through-passage means that forms a valve inlet, a second silicon element having second through-passage means that forms a valve outlet, said first and second elements having respective first and second body surfaces that are bonded together such that said first and second silicon elements form a composite valve body and said first and second through-passage means form a through-passage extending lengthwise through said composite valve body between said valve inlet and said valve outlet, said through-passage comprising a zone that is cooperatively defined by said first and second silicon elements and that comprises juxtaposed first and second zonal surfaces, one of which is on said first silicon element, the other of which is on said second silicon element in circumscription of said second through-passage means, and the two of which are spaced apart lengthwise of said through-passage a given dimension, a gate that comprises a third silicon element and that is selectively positionable lengthwise of said through-passage to open and close said through-passage to flow, said gate comprising a first gate surface that confronts said first zonal surface and a second gate surface that confronts said second zonal surface, the dimension between said first and second gate surfaces in the direction lengthwise of said through-passage being less than said first-mentioned dimension, and means for selectively positioning said gate lengthwise of said through-passage to cause said first gate surface to abut said first zonal surface when the valve is open and said second gate surface to abut said second zonal surface when the valve is closed, one of said first and second gate surfaces being a surface of said third silicon element, and in which both said first and second gate surfaces are always disposed between said first and second zonal surfaces for all selective positioning of said gate.

5. A composite silicon valve as set forth in claim 4 in which said third silicon element comprises a p+ surface layer that abuts said first zonal surface when the valve is open.

6. A composite silicon valve as set forth in claim 5 in which said p+ surface layer has a thickness within the range of about 10 microns to about 30 microns.

7. A composite silicon valve as set forth in claim 4 in which said third silicon element comprises a p+ surface layer that abuts said second zonal surface when the valve is closed.

8. A composite silicon valve as set forth in claim 7 in which said p+ surface layer has a thickness within the range of about 10 microns to about 30 microns.

9. A composite silicon valve as set forth in claim 4 including a fourth silicon element bonded to said second silicon element in covering relation to said second through-passage means and comprising metering orifice means for metering flow leaving said second through-passage means.

10. A composite silicon valve comprising a first silicon element having first through-passage means that forms a valve inlet, a second silicon element having second through-passage means that forms a valve outlet, said first and second elements having respective first and second body surfaces that are bonded together such that said first and second silicon elements form a composite valve body and said first and second through-passage means form a through-passage extending lengthwise through said composite valve body between said valve inlet and said valve outlet, said through-passage comprising a zone that is cooperatively defined by said first and second silicon elements and that comprises juxtaposed first and second zonal surfaces, one of which is on said first silicon element, the other of which is on said second silicon element, and the two of which are spaced apart lengthwise of said through-passage a given dimension, a gate that comprises a third silicon element and that is selectively positionable lengthwise of said through-passage to open and close said through-passage to flow, said gate comprising a first gate surface that confronts said first zonal surface and a second gate surface that confronts said second zonal surface, the dimension between said first and second gate surfaces in the direction lengthwise of said through-passage being less than said first-mentioned dimension, and means for selectively positioning said gate lengthwise of said through-passage to cause said first gate surface to abut said first zonal surface when the valve is open and said second gate surface to abut said second zonal surface when the valve is closed, one of said first and second gate surfaces being a surface of said third silicon element, and a fourth silicon element bonded to said second silicon element in covering relation to said second through-passage means and comprising metering orifice means for metering flow leaving said second through-passage means.

* * * * *